(12) United States Patent
Goby (10) Patent No.: US 6,619,687 B2
(45) Date of Patent: Sep. 16, 2003

(54) QUICK HITCH DRAWBAR ASSEMBLY

(75) Inventor: Larry Goby, McAllen, TX (US)

(73) Assignee: Inter-American Vanguard Corporation, Miami, FL (US)

( * ) Notice: Subject to any disclaimer, the term of this patent is extended or adjusted under 35 U.S.C. 154(b) by 0 days.

(21) Appl. No.: 09/987,365

(22) Filed: Nov. 14, 2001

(65) Prior Publication Data

US 2003/0090084 A1 May 15, 2003

(51) Int. Cl.[7] .................................................. B60D 1/04
(52) U.S. Cl. ........................................ 280/508; 280/514
(58) Field of Search ............................. 280/504, 514, 280/508, 509, 510

(56) References Cited

U.S. PATENT DOCUMENTS

| | | | |
|---|---|---|---|
| 1,398,547 A | | 11/1921 | Graham |
| 1,973,766 A | | 9/1934 | Johnson ............... 280/33.15 |
| 2,067,794 A | * | 1/1937 | Seyferth ................ 267/138 |
| 2,221,492 A | | 11/1940 | Sawyer ................. 280/33.15 |
| 4,147,374 A | | 4/1979 | Jeffes |
| 4,398,745 A | * | 8/1983 | Azzarello et al. ........ 280/508 |
| 5,647,604 A | * | 7/1997 | Russell .................. 280/492 |
| 5,697,454 A | * | 12/1997 | Wilcox et al. ........... 172/447 |
| 5,967,541 A | | 10/1999 | Johansen |
| 6,099,017 A | * | 8/2000 | Schooler ................ 280/510 |

* cited by examiner

*Primary Examiner*—Kevin Hurley
(74) *Attorney, Agent, or Firm*—Jacobson Holman PLLC (57) ABSTRACT

The quick hitch drawbar assembly accepts a standard yoke hitch but simplifies the tractor/scraper connection. Holes in the drawbar are replaced with slots which are angled to prevent accidental disconnection. These slots are wider at the top to simplify alignment of the yoke pin down the slots to be seated in a pin cradle. The forward portion of the drawbar ears are raised to form a stop for the horizontal pin when positioning the tractor.

22 Claims, 6 Drawing Sheets

QUICK HITCH DRAWBAR ASSEMBLY

FIELD OF THE INVENTION

The present invention relates to the field of earth moving equipment and more particularly to a system for quick and accurate connection and disconnection of earth moving equipment and a tractor.

BACKGROUND OF THE INVENTION

A basic hitch connection, used since the early 1950's, consists of a yoke arrangement and a drawbar especially made to accept the horizontal pin used to connect a scraper or other earth moving equipment to a towing tractor. The drawbar consists of a steel bar fastened to the belly of the towing tractor and fitted with two or four ears at the rear of the tractor. Each of the ears includes a hole. The rear portion of the drawbar is supported by a cross member in the tractor frame or an added cross member.

The drawbar and yoke hitch provide a flexible connection between the scraper and tractor. This hitch arrangement has been accepted by most manufacturers and is pervasive in the industry.

This design allows the vertical load of the scraper to be placed as far forward as possible to reduce the effect of raising the tractor front, while keeping the vertical pivot point as far away as possible from the tires to allow full turns. The yoke assembly provides a hinge between the tractor and scraper and lets the scraper rock from side to side over uneven ground. Side travel is limited to 30 degrees due to the arrangement of the yoke halves.

Connection of the scraper to a tractor is accomplished by positioning the tractor at the correct distance and angle to allow installation of a horizontal pin through both the drawbar ears and the scraper hitch. This process requires a "spotter" to direct the tractor driver into position and, when properly positioned, to attempt to install the pin connecting the scraper and tractor by passage of the pin through a series of aligned holes of the drawbar ears and the scraper hitch. This exposes the "spotter" to danger since they must be in the critical zone between the moving tractor and the stationary scraper.

The drawbar pin is a steel shaft with a head welded on one end and threads and a nut on the opposite end. Installation of the pin is not easy since the alignment of the holes of the drawbar ears and the scraper hitch is imprecise, and usually requires the use of a large hammer to drive the pin into place. This may result in damage to the pin, drawbar, or yoke hitch.

SUMMARY OF THE INVENTION

The new quick hitch drawbar assembly of the present invention accepts a standard yoke hitch but simplifies the tractor/scraper connection. Holes in the drawbar are replaced with slots which are angled away from the scraper and toward the rear of the tractor to prevent accidental disconnection. These slots are wider at the top to simplify alignment of the yoke pin down into the slots to seat the yoke pin in a pin cradle. The forward portion of the drawbar ears are raised to form a stop for the horizontal pin when positioning the tractor.

The tractors's hydraulic system is used to raise or lower the scraper to the correct height for connection. The tractor is backed into the scraper yoke hitch where the raised portions of the drawbar ears and locking or latching cam are contacted. The scraper hydraulics, connected to the hydraulic system of the tractor, are then used to lower the scraper into the drawbar slots.

Once the hitch pin is bottomed in the drawbar slots, the locking cams are manually rotated by a removable actuating lever to a locking position to latch the yoke pin in place. A cam pivot pin is situated to prevent accidental hitch disconnection.

The locking cams are retained in position by their weight and two spring loaded ball screws engaging dimples in detents located in the sides of the locking cams. Further, there are physical stops to prevent the cams from traveling past the dimples and causing the ball screws from losing their frictional connection on the cam.

The pivot pin for the latching cams has two notches/grooves located at the edges of the cams. The purpose of these are to provide a "breakaway" point, preventing a rollover of the scraper. The size and depth of the notches allows the cam pin to break as a result of excessive forces, releasing the cams and allowing the scraper to separate from the tractor, therefore preventing a rollover.

Accordingly, it is an object of the present invention to provide a drawbar assembly having a plurality of slotted ears which guide a yoke pin down into a pin cradle.

It is another object of the present invention to provide a drawbar assembly having a plurality of slotted ears which guide a yoke pin down into a pin cradle and having pivotally mounted locking cams rotatable into the path of the slotted ears to engage and retain the yoke pin at the bottom of the pin cradle.

It is still yet another object of the present invention to provide a drawbar assembly having a plurality of slotted ears which guide a yoke pin down into a pin cradle and having pivotally mounted locking cams rotatable into the path of the slotted ears to engage and retain the yoke pin at the bottom of the pin cradle, the locking cams having side grooves engaged by a biased pin in detents at opposite ends of the side grooves for guiding and maintaining the locking cams between a locked and an unlocked position.

It is still yet another object of the present invention to provide a drawbar assembly having a plurality of slotted ears which guide a yoke pin down into a pin cradle and having pivotally mounted locking cams rotatable into the path of the slotted ears to engage and retain the yoke pin at the bottom of the pin cradle, the locking cams having side grooves engaged by a biased pin in detents at opposite ends of the side grooves for guiding and maintaining the locking cams between a locked position and an unlocked position, the locking cams having a removable cams actuating lever for rotation of the locking cam through approximately 180 degrees of motion.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 4, in particular, a quick hitch drawbar assembly embodying the teachings of the subject invention is generally designated as 20. With reference to its orientation in FIG. 1, the drawbar 22 cooperates with a yoke 24 having a yoke pin 26.

Figure 1:
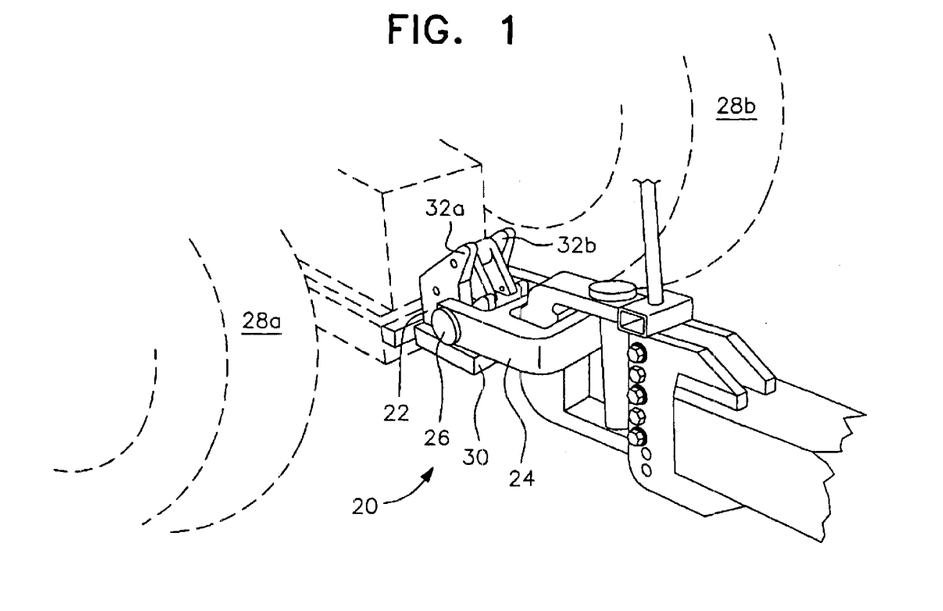
FIG. 1 is a perspective view of the drawbar assembly of the present invention in which a two ear slotted drawbar retains a yoke pin of a scraper mechanism for quickly engaging and releasing the scraper assembly from the tractor.

The yoke 24 may be mounted on a scrapper or other earth moving equipment, or equipment to be mounted on a rear end of a tractor. The drawbar 22 is mounted on the rear of a tractor, its wheels 28a, 28b being shown in phantom. The drawbar is connected at a trailing end 30 of a plate 32 which extends underneath and is connected to the underside of the tractor.

In FIG. 1, the drawbar 22 includes two ears 32a, 32b. However, in the embodiment shown in FIGS. 2 through 4, a drawbar 22 includes four ears 34a, 34b, 34c and 34d. Both of these embodiments operate in the same way to connect a yoke pin to the drawbar.

Figure 2:
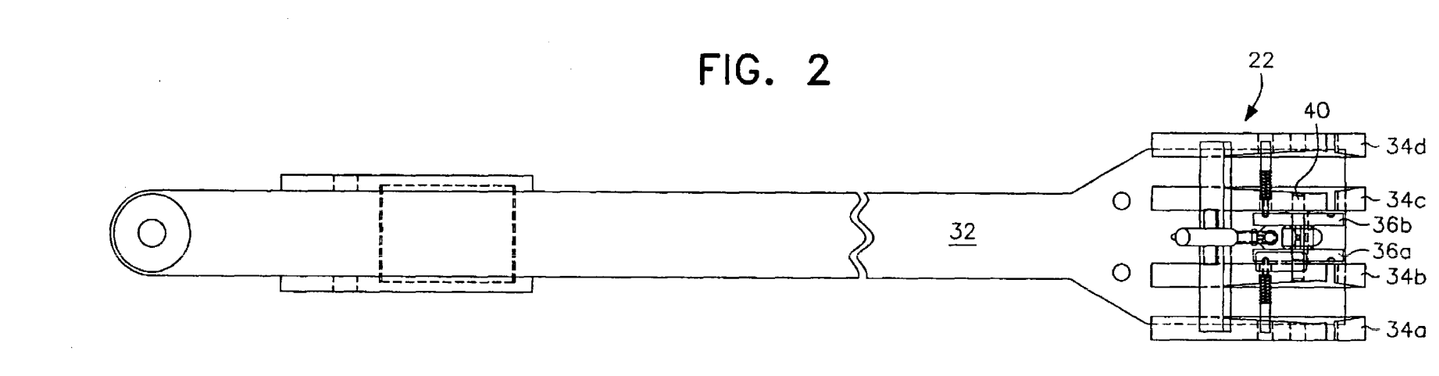
FIG. 2 is a plan view of a four ear drawbar mounted at the end of a connector plate for mounting the drawbar at a rear of a tractor.
Figure 3:
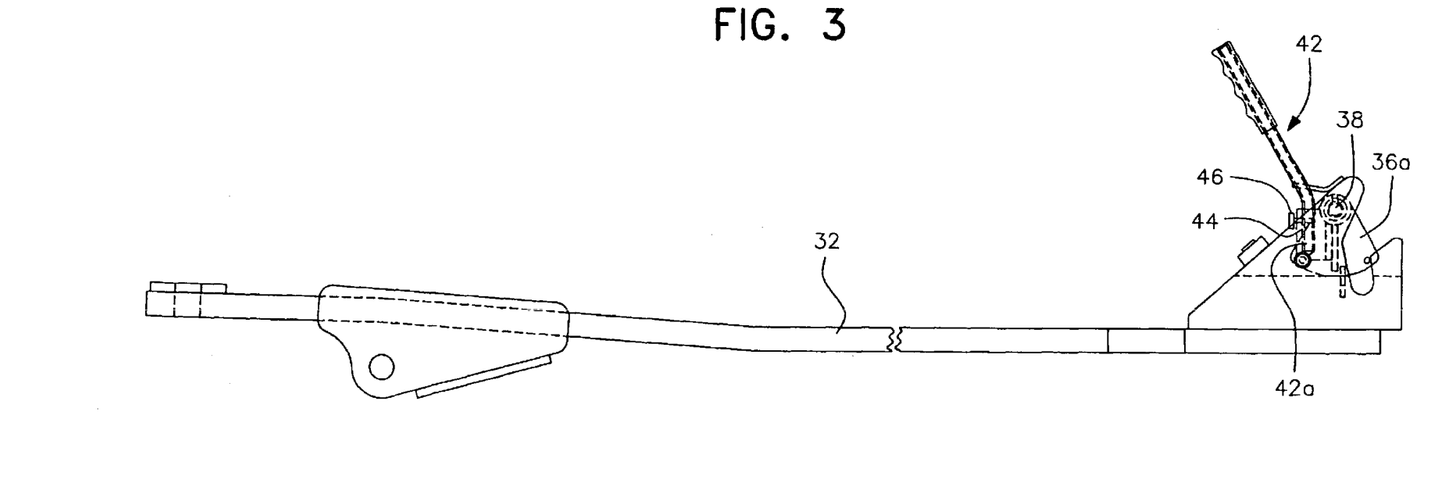
FIG. 3 is a side view of the drawbar shown in FIG. 2.
Figure 4:
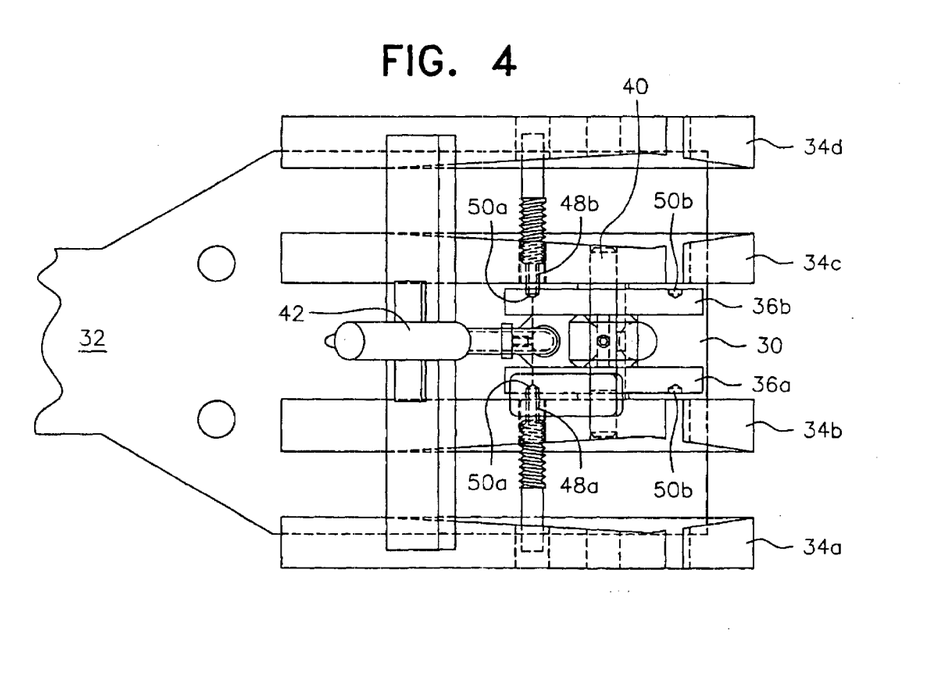
FIG. 4 is an enlarged view of the locking mechanism at one end of the drawbar shown in FIG. 2.

In FIGS. 2 and 3, two interconnected locking cams 36a, 36b are pivotally mounted between ears 34b and 34c about pivot axis 38 passing through pivot pin 40. Pivot pin 40 is shown in FIGS. 2 and 4. The locking cams are pivoted about pivot axis 38 by a removable cam actuating lever 42. Lever 42 has one end 42a engaged in an opening 44 of drawbar block 70 and secured in place by a rotatable thumb screw 46.

As best shown in FIG. 4, the locking cam plates 36a, 36b are retained at the opposite ends of their arcuate path of rotation by opposed spring biased pins 48a, 48b which extend into grooves 52 at detents 50a, located at one end of the grooves 52, for locking the cams in a closed or locked position. The pins 48a, 48b extend into grooves 52 at detents 50b located at the opposite ends of grooves 52, for locking the locking cams in an open position. Each groove 52 is located in a side wall of one of locking cams 36a, 36b. Groove 52 extends between the detents 50a, 50b.

Figure 5:
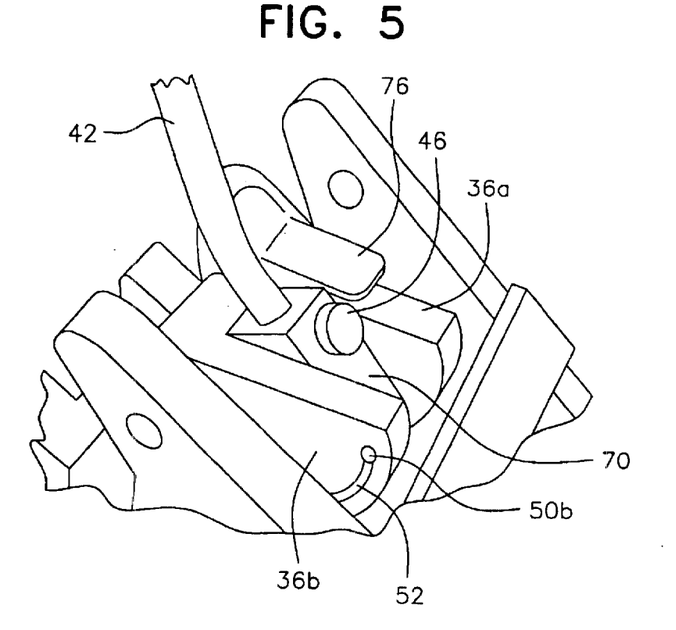
FIG. 5 is a partial view of the drawbar illustrating the locking cams moved to the open position for receipt of a yoke pin between the slotted ears of the drawbar.
Figure 6:
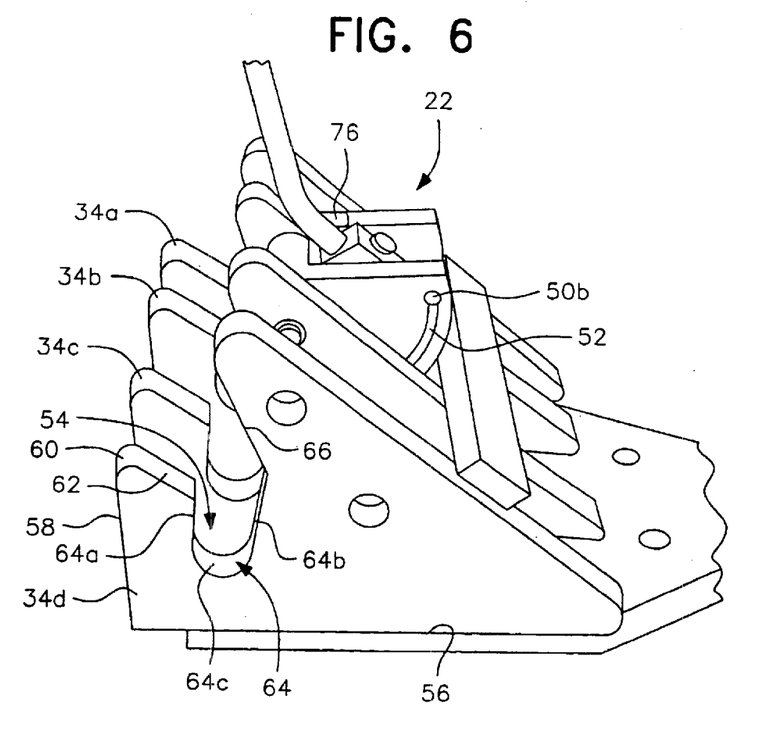
FIG. 6 is a side perspective view of a four ear slotted drawbar embodiment with the locking cams pivoted to the open position.
Figure 7:
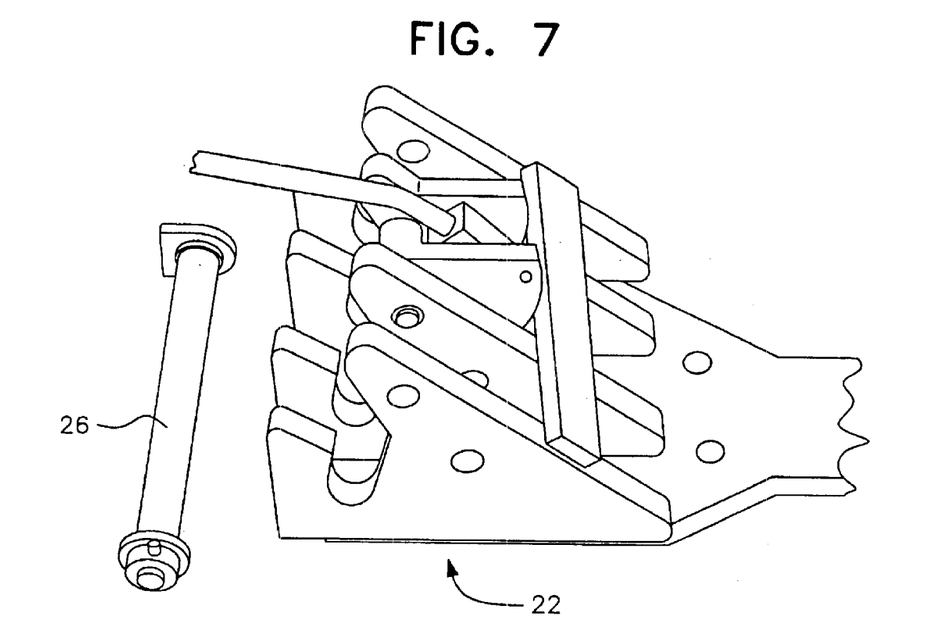
FIG. 7 is a side view of a yoke pin approaching the slotted ears of the drawbar assembly, with the locking cams pivoted to the open position.
Figure 8:
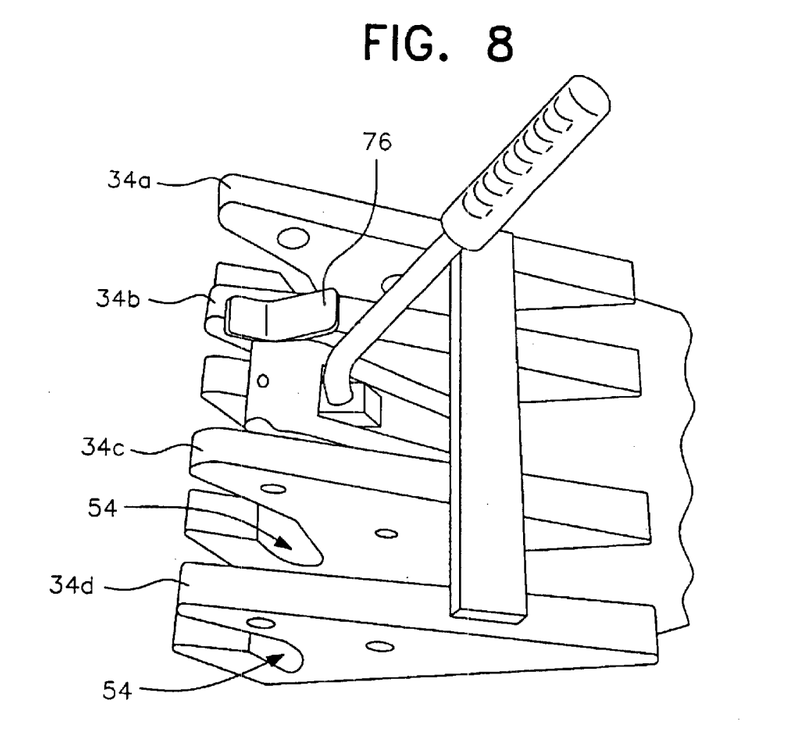
FIG. 8 is a perspective view showing the locking cams moved by a removable cam actuating lever to the locked position of the locking cams to retain a yoke pin in the pin cradle of the slotted ears.

As shown in FIGS. 5 through 7, and especially in FIG. 6, each of the ears 34a through 34d of the drawbar 22 include a groove, opening or slot 54 which will be explained with reference to ear or plate 34d in FIG. 6. The ear 34d includes a flat bottom surface 56 leading to a perpendicular extending surface 58. Surface 58 raises to a height of approximately 5.7 inches and extends by a curved surface 60 into a downwardly tapered surface 62. Surface 62 extends at an angle of approximately 50 degrees with respect to surface 58.

Surface 62 leads into U-shaped or pin cradle surface 64 having legs 64a, 64b, interconnected by curved crosspiece 64c. Surface 64a extends at an angle of approximately 57 degrees with respect to surface 62. Surface 64b extends at an angle of approximately 5 degrees with respect to surface 64a. Surface 64b leads to inclined surface 66. The described shape of the groove, opening or slot 54 is the same for each of the ears or plates 34a through 34d.

The shape of the surfaces of the slot 54 is advantageous in combination for seating a yoke pin 26, as is shown in FIG. 7, in the drawbar 22. Initially, to connect the yoke pin and the equipment it is connected to, a tractor, for example, is started and brought to operating temperature. The tractor is then backed up to the front of the scraper, approaching the yoke pin. The tractor is brought adjacent to the scraper so that the hydraulic lines of the scraper can be connected to the work spools of the tractor. Wood blocks are placed at the front end of the scraper closest to the yoke pin and spaced from the rear wheels of the scraper. By slightly lowering the wheels of the scraper, to achieve a "teeter-toter" affect, the front end of the scraper is slightly elevated above curved surface 60 of the ears 34a through 34d.

In this tipped up position of the yoke pin, the tractor is backed up so that the yoke pin moves into the hitching zone between surfaces 62 and 66 of the ears 34a through 34d. With the locking cams 36a, 36b in the open position, the tractor continues to move rearwardly towards the yoke pin until the yoke pin engages surface 66.

The yoke pin is then directed down into the pin cradle 64 so as to engage surfaces 64a, 64b and 64c. This is accomplished by raising the wheels of the scraper by its hydraulic circuit.

Figure 9:
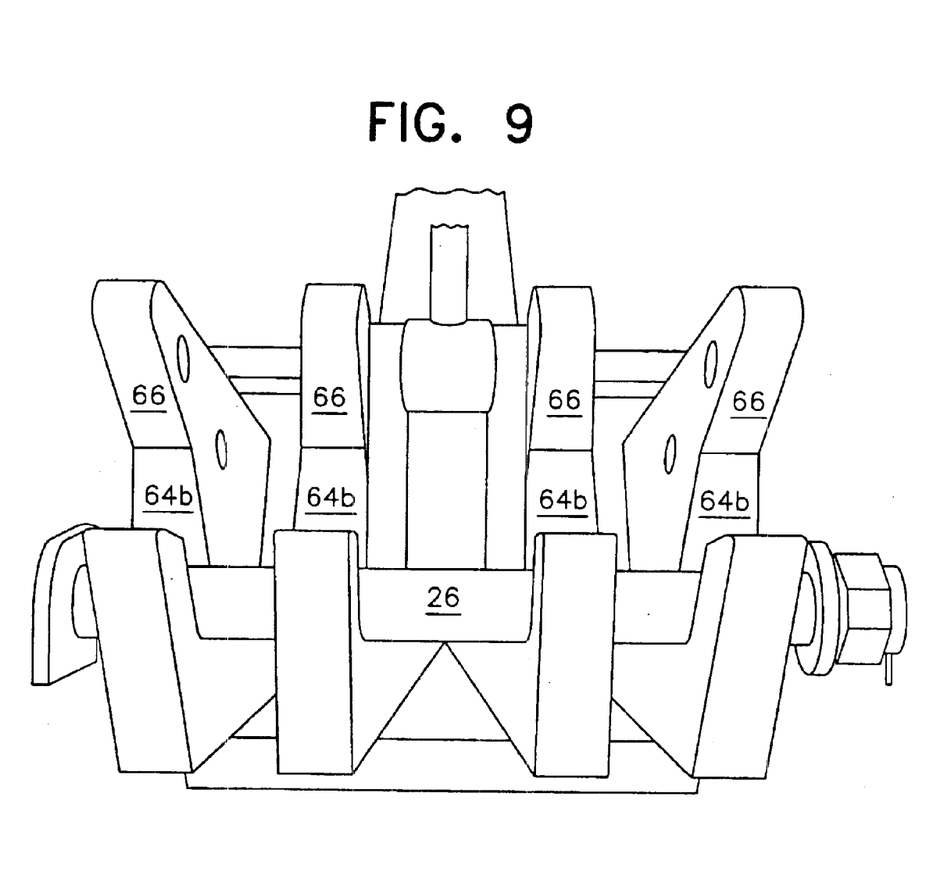
FIG. 9 is a front view of a yoke pin seated in the pin cradle of the slotted ears of the drawbar assembly.

The yoke pin comes to rest at the bottom of the pin cradle formed by the ears 34a through 34d as shown in FIG. 9. The yoke pin is now fully engaged with the drawbar.

The cam actuating lever is then inserted into the drawbar block 70 and the thumb screw 46 rotated to lock the lever 42 in position. The handle is then moved in the direction of arrow 72 to the position shown in solid lines in FIG. 10 so as to pivot the cams 36a, 36b to the closed position shown in solid lines in FIG. 10.

Figure 10:
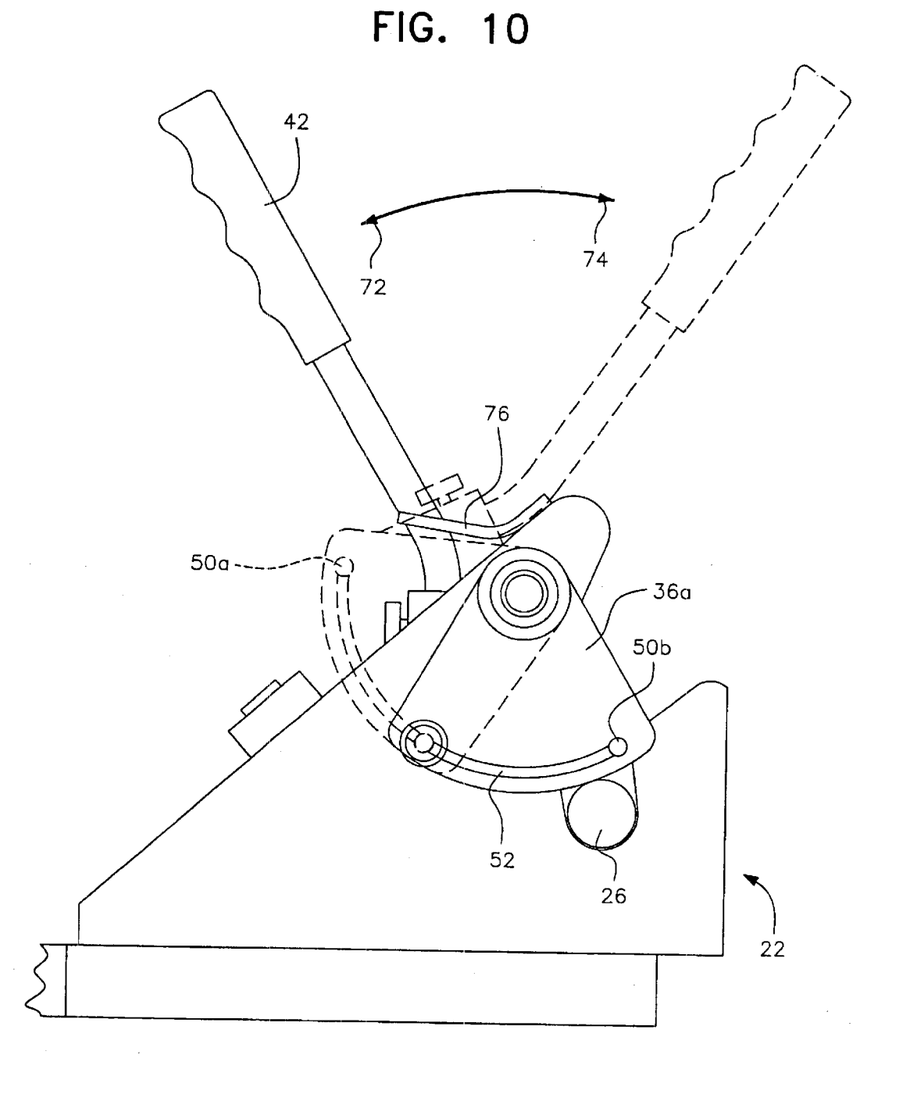
FIG. 10 schematically illustrates the rotation of the locking cams over a yoke pin held in the pin cradle of the slotted ears of the drawbar assembly and the rotation of the locking cams by the removable cam actuating lever to a position away from the pin cradle, as illustrated in dotted lines, to remove the yoke pin from the pin cradle.

In this position, the locking position, spring biased pins 48a and 48b engage in detent openings 50a in the sidewalls of the cam plates 36a, 36b. The yoke pin 26 is thereby locked in the drawbar. The lever handle 42 is then removed.

Similarly, to remove the yoke pin 26, the handle 42 is reinserted and locked in the drawbar block 70 and the handle rotated in the direction of arrow 74 to the position shown in dotted lines in FIG. 10. The bias force of the pins 48a, 48b is overcome so that the pins 48a, 48b are allowed to slide in the grooves 52 until engaging detents 50b. To prevent over-extension of the cam plates 36a, 36b beyond the position shown in dotted lines in FIG. 10, a cam stop plate 76 is interposed in the continued path of movement of the cam plates in the direction of movement of the lever 42 towards arrow 74 as shown in FIGS. 5 and 6.

By the drawbar assembly of the present invention, a tractor and rear traveling equipment may be quickly and easily interconnected. Similarly, the two pieces of machinery may be separated for subsequent use of the tractor with a different piece of equipment.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A drawbar assembly for interconnecting a tractor to a piece of equipment, said drawbar assembly comprising:
    a drawbar including a plurality of aligned plates having a groove including a pin cradle and an opening on one side of the plates, the opening being wider than the pin cradle and the pin cradle being located at an opposite end of the groove from the opening for guiding a horizontally oriented yoke pin through the opening to be seated in the pin cradle,
    at least one locking cam pivotally mounted with respect to the plurality of aligned plates for movement between an open position for allowing the yoke pin to pass through the opening to the pin cradle and a closed position for holding the yoke pin in the pin cradle, and
    an actuating lever being removably mounted on the locking cam for movement of the locking cam.

2. A drawbar assembly as claimed in claim 1, wherein the locking cam is located between two of the plurality of aligned plates.

3. A drawbar assembly as claimed in claim 1, wherein the locking cam includes a groove engaged by a pin for guiding movement of the locking cam.

4. A drawbar assembly as claimed in claim 3, wherein the pin is spring biased.

5. A drawbar assembly as claimed in claim 4, wherein the groove includes a detent at each.end of the groove being engaged by the spring biased pin to hold the locking cam in one of the open position and the closed position.

6. A drawbar assembly as claimed in claim 1, wherein there are four plates.

7. A drawbar assembly as claimed in claim 1, wherein the groove opening includes a rearwardly inclined surface leading to a U-shaped pin cradle surface.

8. A drawbar assembly as claimed in claim 3, wherein there are two locking cams and two opposed pins engaging the locking cams.

9. A drawbar assembly for interconnecting a tractor to a piece of equipment, said drawbar assembly comprising:
    a drawbar having at least one plate with a groove including an opening and a pin cradle with the opening leading to the pin cradle, and at least one locking cam pivotally mounted with respect to the plate for pivotal movement of the locking cam so as to hold and allow removal of a yoke pin in the pin cradle after passing of the yoke pin through the opening, and
    an actuating lever being removably mounted on the locking cam for movement of the locking cam.

10. A drawbar assembly as claimed in claim 9, wherein the locking cam is located between two aligned plates.

11. A drawbar assembly as claimed in claim 9, wherein the locking cam includes a groove engaged by a pin for guiding movement of the locking cam.

12. A drawbar assembly as claimed in claim 11, wherein the pin is spring biased.

13. A drawbar assembly as claimed in claim 12, wherein the groove includes a detent at each end of the groove being engaged by the spring biased pin to hold the locking cam in one of an open position and a closed position.

14. A drawbar assembly as claimed in claim 9, wherein there are four plates.

15. A drawbar assembly as claimed in claim 9, wherein the opening of the groove includes an inclined surface leading to a U-shaped pin cradle surface.

16. A drawbar assembly as claimed in claim 11, wherein there are two locking cams and two opposed pins engaging the locking cams.

17. A drawbar assembly for interconnecting a tractor to a piece of equipment, said drawbar assembly comprising:
    a drawbar including a plurality of aligned plates having a groove including a pin cradle and an opening on one side of the plates, the opening being wider than the pin cradle and the pin cradle being located at an opposite end of the groove from the opening for guiding a horizontally oriented yoke pin through the opening to be seated in the pin cradle,
    at least one locking cam pivotally mounted with respect to the plurality of aligned plates for movement between an open position for allowing the yoke.pin to pass through the opening to the pin cradle and a closed position for holding the yoke pin in the pin cradle, and
    an actuating lever being mounted on the locking cam for movement of the locking cam,
    the locking cam including a groove engaged by a pin for guiding movement of the locking cam.

18. A drawbar assembly for interconnecting a tractor to a piece of equipment, said drawbar assembly comprising:
    a drawbar including four aligned plates having a groove including a pin cradle and an opening on one side of the plates, the opening being wider than the pin cradle and the pin cradle being located at an opposite end of the groove from the opening for guiding a horizontally oriented yoke pin through the opening to be seated in the pin cradle,
    at least one locking cam pivotally mounted with respect to the plurality of aligned plates for movement between an open position for allowing the yoke pin to pass through the groove opening to the pin cradle and a closed position for holding the yoke pin in the pin cradle.

19. A drawbar assembly for interconnecting a tractor to a piece of equipment, said drawbar assembly comprising:
    a drawbar including a plurality of aligned plates having a groove including a pin cradle and an opening on one side of the plates, the opening being wider than the pin cradle and the pin cradle being located at an opposite end of the groove from the opening for guiding a horizontally oriented yoke pin through the opening to be seated in the pin cradle, the opening including a rearwardly inclined surface leading to a U-shaped pin cradle surface of the pin cradle, and
    at least one locking cam pivotally mounted with respect to the plurality of aligned plates for movement between an open position for allowing the yoke pin to pass through the groove opening to the pin cradle and a closed position for holding the yoke pin in the pin cradle.

20. A drawbar assembly for interconnecting a tractor to a piece of equipment, said drawbar assembly comprising:

a drawbar having at least one plate with a groove including an opening and a pin cradle with the opening leading to the pin cradle, and at least one locking cam pivotally mounted with respect to the plate for pivotal movement of the locking cam so as to hold and allow removal of a yoke pin in the pin cradle after passing of the yoke pin through the opening, and an actuating lever mounted on the locking cam for movement of the locking cam, the locking cam including a groove engaged by a pin for guiding movement of the locking cam.

21. A drawbar assembly for interconnecting a tractor to a piece of equipment, said drawbar assembly comprising:

a drawbar having four plates with a groove including an opening and a pin cradle with the opening leading to the pin cradle, and at least one locking cam pivotally mounted with respect to the plate for pivotal movement of the locking cam so as to hold and allow removal of a yoke pin in the pin cradle after passing of the yoke pin through the opening.

22. A drawbar assembly for interconnecting a tractor to a piece of equipment, said drawbar assembly comprising:

a drawbar having at least one plate with a groove including an opening and a pin cradle with the opening leading to the pin cradle, and at least one locking cam pivotally mounted with respect to the plate for pivotal movement of the locking cam so as to hold and allow removal of a yoke pin in the pin cradle after passing of the yoke pin through the opening, the opening of the groove including an inclined surface leading to a U-shaped pin cradle surface of the pin cradle.

\* \* \* \* \*